L. B. SHARP.
AUTOMOBILE AXLE.
APPLICATION FILED OCT. 7, 1910.
1,001,697.
Patented Aug. 29, 1911.
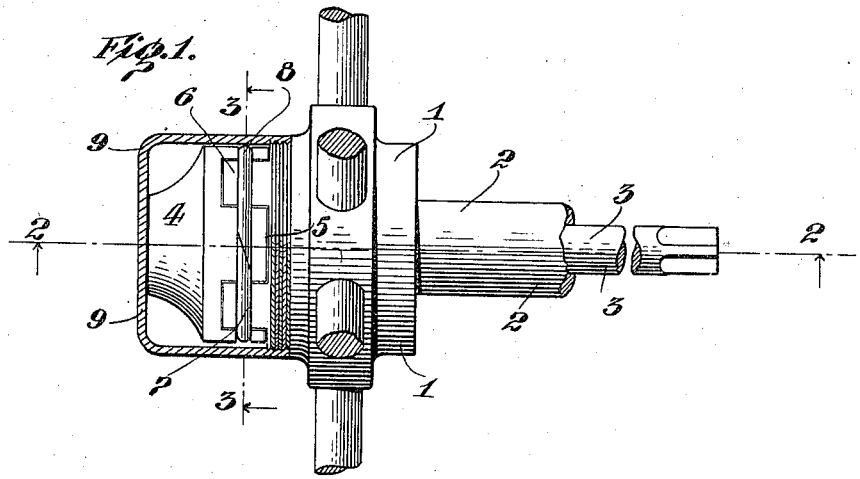
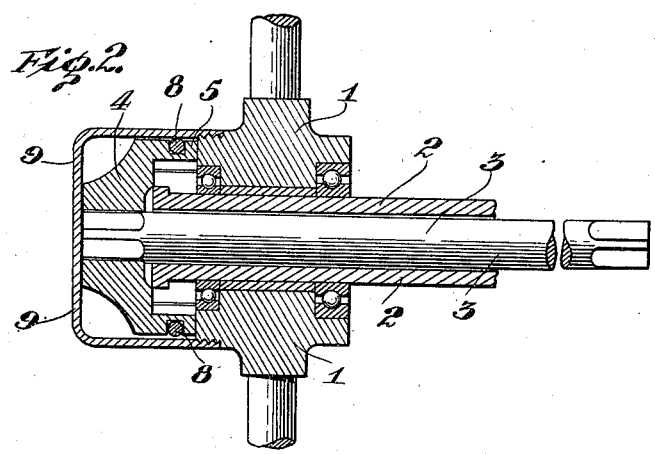
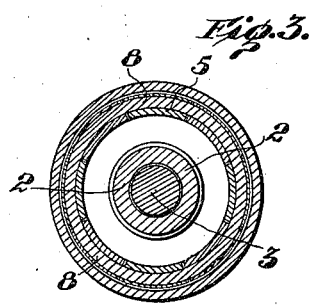
WITNESSES
C. S. Ashley
L. T. Shaw
INVENTOR
Lewis B. Sharp:
BY
Betts Sheffield Bratley Betts
ATTORNEY

UNITED STATES PATENT OFFICE.

LEWIS B. SHARP, OF FAR ROCKAWAY, NEW YORK.

AUTOMOBILE-AXLE.

1,001,697. Specification of Letters Patent. Patented Aug. 29, 1911.

Application filed October 7, 1910. Serial No. 585,784.

*To all whom it may concern:*

Be it known that I, LEWIS B. SHARP, a citizen of the United States, residing at Far Rockaway, in the county of Queens and State of New York, have invented certain new and useful Improvements in Automobile-Axles, of which the following is a specification.

This invention relates to automobile axles known as the full floating type, in which there is a fixed outer housing having the differential and drive at the center, with wheels at each end mounted on the fixed housing or casing, there being a driving shaft or axle in two parts extending from the differential on each side through the casing and engaging the outer end of the hub of the wheel by means of a spider fixed to the end of the shaft. Heretofore it has been the practice to secure this spider and driving shaft in position by means of a hub cap which covered the spider and held it and the driving shaft in position. Although in use to a large extent, this means of securing the parts in position has been found unsatisfactory and unreliable because of the difficulty in keeping the hub cap in position, and many accidents and much inconvenience have resulted from the hub cap being displaced, due to constant vibration, the spider and one-half of the rear axle falling away, thus disarranging the driving mechanism of the car.

My invention relates to a simple and cheap means for securing the spider and axle in position, even though the hub cap should become displaced, said means being independent of the cap.

Referring to the drawings forming part of this specification, Figure 1 is a side elevation of my improvement applied to one end of a full floating rear axle, with the hub of a wheel thereon, the hub cap being partly broken away. Fig. 2 is a longitudinal section of the structure shown in Fig. 1 taken on the line 2—2 of that figure. Fig. 3 is a transverse section taken on the line 3—3 of Fig. 1.

Referring in detail to the drawings, the numeral 1 designates the hub of the wheel which is mounted to rotate on the fixed casing 2 of the axle. The driving member or floating axle 3 is contained in the fixed housing and at one end engages and rotates the spider 4, and at the other end is engaged and rotated by the differential at the middle of the axle. The spider 4 has projections 5 which interlock with oppositely disposed projections 6 formed on the hub 1. A groove 7 is formed in the surface of the interlocking projections 5 and 6, and a split ring 8, formed of any suitable material, rests in this groove, and effectively holds the interlocking projections in operative position and prevents the spider from falling away from the hub, even though the hub cap 9, which ordinarily secures these parts in position, becomes displaced. It will be understood that the member 3 is the driving member, receiving the power at the differential and transmits it through the hub 1 and through the spider 4, and that if, for any reason, the spider 4 should become displaced, the application of power is impossible, and the member 3 may readily fall out of the housing and become lost or damaged.

The operation of my device is obvious from the foregoing description.

It will be observed that the ring 8 prevents longitudinal movement of the spider member 4 with respect to the hub and the projections 6 thereon. To attain this a radial surface on the member 4 lies on one side of the ring and a radial surface on the hub lies on the other side thereof but offset with respect to the said hub surface. Otherwise stated the locking ring or member 8 lies between a radial surface on the spider 4 and a radial surface on the hub and bears upon them alternately at succeeding points of its length so as to prevent the longitudinal displacement of the hub and spider with respect to each other.

While I have described only one embodiment of my invention, I am aware that modifications may be made therein by those skilled in the art without departing from the spirit of my invention or the scope of my claims.

What I claim is:

1. The combination with a wheel, of a tubular journal therefor, a drive shaft passing through said tubular journal, a spider on one end of said shaft engaging said hub, an external locking member engaging both said hub and said spider to retain said spider in position, and a hub cap inclosing said spider and said locking member.

2. The combination of a hub having projections at one end with a spider at the same end of the hub and having projections interlocking with the projections of the hub, and a circular groove formed in the outer surface of said interlocking projections, and a split ring resting therein, for the purpose hereinbefore described.

3. The combination of a hub having projections at one end with a spider at the same end of the hub and having projections interlocking with the projections of the hub, and a circular groove formed in the outer surface of said interlocking projections, and a member resting therein, for the purpose hereinbefore described.

4. The combination with a wheel hub, of a tubular journal for said hub, a drive shaft passed through said tubular journal, a spider member on said shaft, said spider member and said hub being provided with complemental interlocking portions, an external locking member engaging said interlocking portions to retain said spider in position, and a hub cap inclosing said spider and said locking member.

LEWIS B. SHARP.

Witnesses:
WALTER S. JONES,
JOHN W. PETERS.

Copies of this patent may be obtained for five cents each, by addressing the "Commissioner of Patents, Washington, D. C."